May 1, 1956  J. F. PETERSON  2,743,833
LIFT CART
Filed May 11, 1953  2 Sheets-Sheet 2
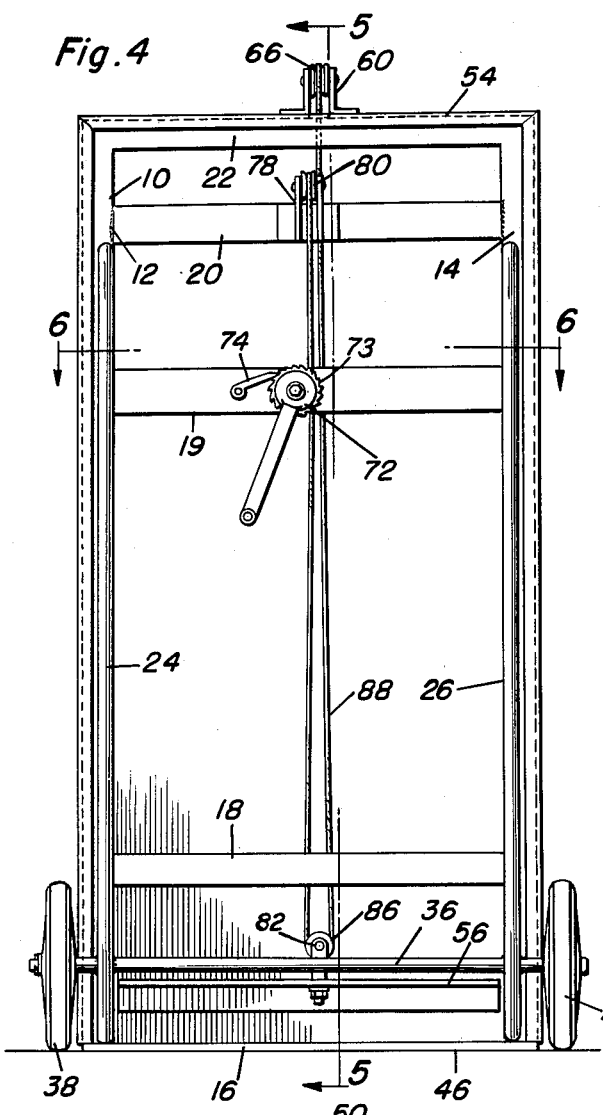
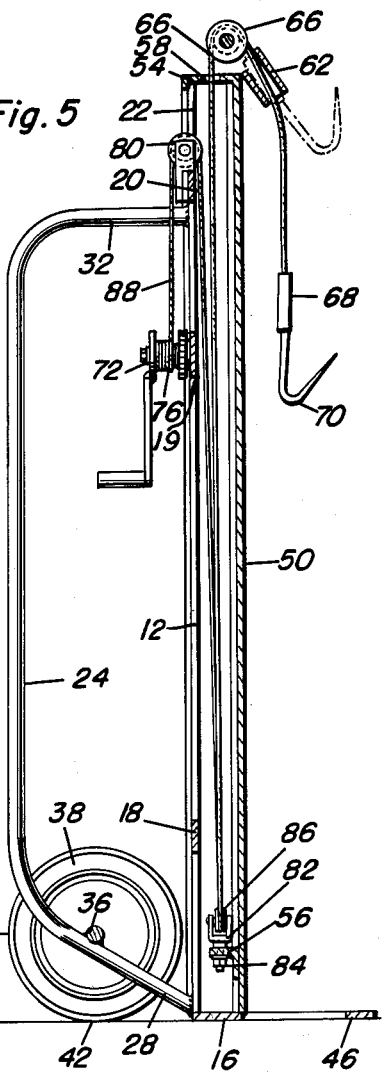
James F. Peterson
INVENTOR.

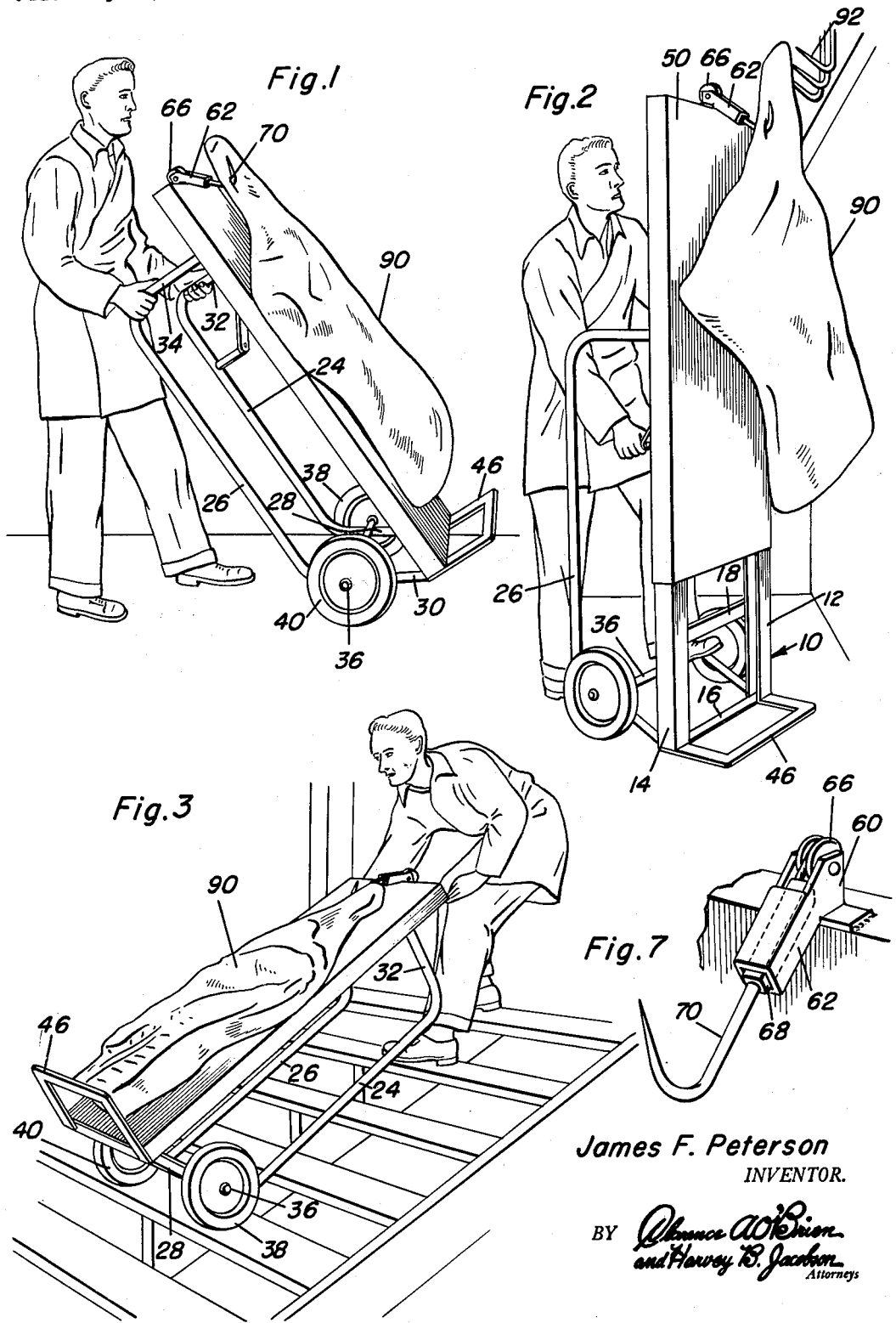

United States Patent Office 2,743,833
Patented May 1, 1956

2,743,833

LIFT CART

James F. Peterson, Deadwood, Oreg., assignor to N & P Enterprises, Inc., Eugene, Oreg., a corporation of Oregon Application May 11, 1953, Serial No. 353,943

4 Claims. (Cl. 214—651)

This invention relates to a lift cart and particularly to a cart for transporting and lifting meat.

The care, transportation and hanging of meat is an extremely dangerous and hazardous occupation in that it is necessary to carry and lift extremely unwieldly and heavy pieces of animal carcasses. Heretofore, it has been possible to use hand carts to move the carcasses about but then it is necessary to lift the carcasses off of the cart and elevate them by hand to place them on the hooks on the racks or other hangers on which the meat was to be placed. All of this is extremely heavy and awkward work which frequently resulted in injury to the persons handling the meat.

The present invention provides a cart which may be used, not only to carry the meat about from place to place, but also to lift the meat up to the hooks in the various hanging compartments so that the manual heavy labor may be eliminated.

The lift cart according to the invention comprises a frame having skids mounted substantially parallel to the frame and wheels so mounted that the entire structure may be readily wheeled about or rested on the skids so it will not move during loading operations. Further the wheels are arranged tangential to the plane of the end of the frame so that the frame may be stood on end and supported in vertical position by means of the wheels.

Further the frame is provided with a longitudinally sliding or telescoping bed and a winch is provided and operatively connected to a cable having a meat hook at the end thereof, which cable is so guided with respect to the frame and telescoping bed that the meat hook may be extended and the winch utilized to drag a carcass onto the bed, and thereafter operation of the winch will be effective to elevate the bed and the carcass supported thereby.

It is accordingly an object of the invention to provide an improved lift cart.

It is a further object of the invention to provide a lift cart which will rest in stable equilibrium in either horizontal or vertical position.

It is a further object of the invention to provide a cart with skids so that it may be used on inclines, stairways and the like.

It is a further object of the invention to provide a cart with an extension hook line so that a carcass may be attached to and moved onto the cart by means of a winch.

It is a further object of the invention to provide a winch arrangement for causing longitudinal motion of the bed of a cart on its frame.

Other objects and many of the attendant advantages of the present invention will be apparent from the following detailed description taken in conjunction with the accompanying drawing in which:

Figure 1 is a perspective view of the lift cart in carrying position;

Figure 2 is a perspective view of the lift cart in lifting position;

Figure 3 is a perspective view showing the use of the skids on stairs;

Figure 4 is a rear elevation of the lift cart;

Figure 5 is a sectional elevation of the lift cart taken substantially on the plane indicated by the line 5—5 of Figure 4 and showing the arrangement of the extension line for moving the carcass or lifting the bed of the cart;

Figure 6 is a cross sectional view of the lift cart taken substantially on the plane indicated by the line 6—6 of Figure 4; and Figure 7 is an enlarged perspective view showing the hook bracket.

In the exemplary embodiment according to the invention a longitudinal frame 10 is provided, the frame comprising side bars 12 and 14 and a plurality of cross bars 16, 18, 19, 20 and 22. Side bars 12 and 14, together with the cross bars, form a particularly rigid skeleton-like frame on which the remaining portions of the cart are mounted.

A pair of skids 24 and 26 are fixed to the frame and provided with angulated end portions 28 and 30, respectively. The angulated end portions 28 and 30 connect the skids 24 and 26 to the forward end of the frame and particularly to the forward ends of the side bars 12 and 14 adjacent the forward cross bar 16. Handle portions 32 and 34 connect the rear ends of the skids to the side bars 12 and 14 and further serve as spacing members to maintain the skids 24 and 26 in parallel relation to the side bars 12 and 14. A transverse axle 36 is mounted on the angulated end portions 28 and 30 and secured rigidly thereto by any suitable means such as welding. Wheels 38 and 40 are journaled on the axle 36 and the axle 36 is so positioned with respect to the diameter of the wheels 38 and 40 that the forward point 42 on the periphery of the wheels 38 and 40 is tangential to the ends 16 of the frame and the lower point 44 of the periphery of the wheels 38 and 40 is tangential to the skids 24 and 26. By providing the periphery of the wheels tangential to the frame the device may be stood upright with the wheels serving as stabilizers. A toe piece 46 is preferably rigidly connected to the end of the frame and extends vertically therefrom so that it may be used either as an abutment to maintain articles on the bed presently to be described or as a support to help maintain the frame in an upright position.

A substantially flat bed 50 is provided with guide flanges 52 which embrace the rails 12 and 14, respectively and are slidable longitudinally therealong. A rear flange 54 on the bed is movable into abutting relation with the end member 22 of the frame. The forward end of the flat bed is substantially open and carries a transverse angle bar 56 preferably of angular formation extending laterally between the side bars 12 and 14.

An aperture 58 is provided in the flange 54 for a purpose presently to be described. A bracket 60 is rigidly secured on the flange 54 and extends rigidly therefrom in straddling relation to the aperture 58. A socket member 62 extends in angular relation to the surface of the bed 50 and in alignment with a sheave 66 mounted in the bracket 60. Preferably the interior of the socket 62 is substantially square for receiving the square shank 68 of a hook 70 adapted to slide into the socket 62.

A winch 72 is mounted on the cross bar 19 and is provided with a ratchet 73, which cooperates with a dog 74 so that the winch may be retained in any given position. The winch is provided with a drum 76 on which a flexible tension member 88, such as a rope, wire cable or chain may be fixed and wound or unwound as may be desired. An upstanding bracket 78 is mounted adjacent the top of the frame, on the cross bar 20, and has a sheave 80 mounted thereon. A second bracket 82 is mounted on the angle bar 56 by any suitable means, such as the bolt 84, and carries a sheave 86 adjacent the lower end of the bed. A flexible member 88 herein shown as a wire cable is wound on the drum 76 and entrained over the sheaves 80, 86 and 66, in that order, and then extends through the socket 62, its free end being fixed to the shank 68 of the hook 70.

In the operation of the device, the cart may be placed either horizontally or vertically and the load such as a portion of a carcass 90 may be placed on the cart in any desired manner. If desired, the line 88 may be extended through the socket 62 and the hook 70 may be attached to the carcass, after which the winch 72 may be operated to shorten the line 68 and cause the carcass to be dragged onto the bed 50. After the carcass has been placed on the bed 50 it may be readily held thereon either by means of the toe piece 46 or by means of the hook 70.

Because of the tangential relation of the wheels to both the end of the cart and to the skids the device may be stood on end or allowed to lie in horizontal position where it will be substantially immovable. If the rear end of the cart is raised the skids will be brought out of contact with the floor and the entire cart may be readily trundled about on the wheels 38 and 40. In the event it is desired to go up or down a stairway, the angulation will be such that the skids will touch the edge of the treads so that the wheels will be substantially inoperative and the device may be slid up or down the stairway. When it is desired to lift the carcass upwardly and hang it on a support, such as one of the hangers 92, the cart is maneuvered into position and stood upright, after which the winch may be operated to bring the hook member into the socket 62 and raise the bed 50 upwardly along the frame. Obviously, to reverse the proceedings the hook will be engaged with the meat 90 and the bed elevated further to release the meat from the hooks 92 after, which it may be lowered into carrying position.

It will be apparent that the present invention provides a convenient means for either carrying or lifting meat or other articles without the necessity of manual handling thereof.

For the purpose of exemplification a particular embodiment of the invention has been shown and described according to the best present understanding thereof. However, it will be apparent to those skilled in the art that changes and modifications may be made in the construction and arrangement of the parts thereof without departing from the true spirit and scope of the invention.

What is claimed as new is as follows:

1. A cart comprising a substantially flat longitudinally extending frame, a pair of skids extending in spaced parallel relation to said frame, angulated front end portions of said skids securing said skids to the forward portion of said frame, said front end portions extending rearwardly in angular relation to said frame, rear end portions securing said skids to said frame at a point remote to the forward portion of the frame, wheels mounted on said angulated front end portions, a substantially flat bed telescopically mounted on said frame, a winch mounted on said frame intermediate the ends thereof, a sheave mounted adjacent the rear end of said frame, a second sheave mounted on the underside of the bed adjacent the front end thereof, a third sheave mounted on the rear end of said bed, a flexible tension member secured on said winch and entrained over said sheaves in sequence, a hook socket fixed to said bed in aligned relation with said third sheave, said flexible tension member extending through said socket, and a hook secured to the free end of said flexible tension member.

2. A lift cart comprising a substantially flat rectangular frame, a pair of skid portions, angulated end members securing the front ends of said skids to the forward portion of said frame, handle portions securing the rear ends of said skids to said frame, an axle mounted transversely of said angulated end portions, a pair of wheels journaled on said axle, one portion of the periphery of said wheels being tangential to said skids, another portion of the periphery of said wheels being tangential to the end of said frame, a flat bed longitudinally slidable on said frame, a winch mounted on said frame, a first sheave mounted adjacent the rear end of said frame, a second sheave mounted adjacent the front end of said bed, a bracket mounted on the rear end of said bed, a hook socket fixed on said bracket, a third sheave mounted in said bracket, a flexible member secured on said winch and extending through said hook socket, said flexible member being entrained over said sheaves, and a hook secured to the free end of said flexible member.

3. A trundle lift cart comprising an elongated frame having a pair of handles at one end, an axle mounted transversely of the other end of said frame, a pair of wheels journaled on said axle, a flat bed extending longitudinally of said frame, means supporting said flat bed and guiding the same for longitudinal movement with respect to said frame, a manually operable winch mounted on said frame adjacent said handles, a flexible tension element operatively secured to said winch, a first sheave mounted on said flat bed toward said axle and wheels, a second sheave mounted on said flat bed toward the opposite end thereof, said flexible tension element being trained about said first sheave and then said second sheave, article securing means fixed to the free end of said flexible tension element, and arresting means to prevent retraction of said flexible tension element from said second sheave whereby operation of said winch first causes said article securing means to be drawn toward said second sheave until arrested by said arresting means and continued operation of said winch thereafter moves said flat bed longitudinally of said frame.

4. A trundle lift cart comprising an elongated frame having a pair of handles at one end, an axle mounted transversely of the other end of said frame, a pair of wheels journaled on said axle, a flat bed extending longitudinally of said frame, means supporting said flat bed and guiding the same for longitudinal movement with respect to said frame, a manually operable winch mounted on said frame adjacent said handles, a flexible tension element operatively secured to said winch, a first sheave mounted on said flat bed toward said axle and wheels, a second sheave mounted on said flat bed toward the opposite end thereof, said flexible tension element being trained about said first sheave and then said second sheave, article securing means fixed to the free end of said flexible tension element, arresting means to prevent retraction of said flexible tension element from said second sheave whereby operation of said winch first causes said article securing means to be drawn toward said second sheave until arrested by said arresting means and continued operation of said winch thereafter moves said flat bed longitudinally of said frame, and means to lock said winch.

References Cited in the file of this patent
UNITED STATES PATENTS

| Number | Name | Date |
|---|---|---|
| 1,059,595 | Clark | Apr. 22, 1913 |
| 1,377,978 | Weber | May 10, 1921 |
| 2,263,879 | Jorgenson | Nov. 25, 1941 |
| 2,514,825 | Zenko | July 11, 1950 |